(12) United States Patent
Abdul-Malik et al.

(10) Patent No.: US 12,101,381 B2
(45) Date of Patent: Sep. 24, 2024

(54) SYSTEM FOR GENERATING A USER INTERACTION TIMELINE

(71) Applicant: Truist Bank, Charlotte, NC (US)

(72) Inventors: Tahira Abdul-Malik, Memphis, TN (US); Karthik Lingappan, Winston-Salem, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/401,773

(22) Filed: Jan. 2, 2024

(65) Prior Publication Data

US 2024/0137421 A1    Apr. 25, 2024

Related U.S. Application Data

(63) Continuation of application No. 17/660,227, filed on Apr. 22, 2022, now Pat. No. 11,909,830.

(51) Int. Cl.
| | |
|---|---|
| *H04L 67/146* | (2022.01) |
| *G06N 3/044* | (2023.01) |
| *G06Q 40/02* | (2023.01) |
| *H04L 67/1396* | (2022.01) |
| *H04L 67/306* | (2022.01) |

(52) U.S. Cl.
CPC .......... *H04L 67/146* (2013.01); *G06N 3/044* (2023.01); *G06Q 40/02* (2013.01); *H04L 67/1396* (2022.05); *H04L 67/306* (2013.01)

(58) Field of Classification Search
CPC . H04L 67/146; H04L 67/1396; H04L 67/306; G06N 3/044; G06Q 40/02
USPC ........................................................ 709/203
See application file for complete search history.

(56) References Cited

U.S. PATENT DOCUMENTS

| | | | |
|---|---|---|---|
| 11,017,474 B1* | 5/2021 | Guerrero | G06F 3/04817 |
| 2014/0136381 A1* | 5/2014 | Joseph | G06Q 40/02 |
| | | | 705/35 |
| 2017/0330205 A1 | 11/2017 | Belanger et al. | |
| 2019/0019213 A1 | 1/2019 | Silberman et al. | |
| 2019/0347094 A1* | 11/2019 | Sullivan | G06F 8/34 |
| 2020/0151728 A1 | 5/2020 | Waters et al. | |
| 2021/0192078 A1 | 6/2021 | Cosman et al. | |
| 2021/0350487 A1 | 11/2021 | Kelton et al. | |
| 2022/0147895 A1 | 5/2022 | Katz et al. | |

(Continued)

*Primary Examiner* — Nicholas R Taylor
*Assistant Examiner* — Chong G Kim
(74) *Attorney, Agent, or Firm* — Michael A. Springs, Esq.; Shumaker, Loop & Kendrick, LLP; Patrick B. Horne

(57) ABSTRACT

A system for generating a user interaction timeline for interactions that occur between a user of a bank and the bank or its representatives. The system provides an interaction source that stores information and data for each of the interactions over all banking channels and a source of data and information that identifies each of the banks users. The system also performs an application sessions process that groups the interactions that each user performs over a particular channel at a certain time frame into an interaction session having a time stamp for that time frame. The system further performs an application interaction process that aggregates all of the available data and information about each user and the data and information for each interaction by the user with the bank, and creates an interaction timeline for each user over all of the banking channels for a predetermined time.

19 Claims, 6 Drawing Sheets

(56) References Cited

U.S. PATENT DOCUMENTS

2023/0319035 A1\* 10/2023 Rao .................... G06V 40/161
                                                              726/6
2023/0334339 A1   10/2023 Lowe \* cited by examiner

SYSTEM FOR GENERATING A USER INTERACTION TIMELINE

CROSS REFERENCE TO RELATED APPLICATIONS

This application is a continuation application of U.S. application Ser. No. 17/660,227, titled System and Method for Generating a Client Interaction Timeline, filed Apr. 22, 2022, the entirety of which is herein incorporated by reference.

BACKGROUND

Field

This disclosure relates generally to a system for generating a user interaction timeline and, more particularly, to a system for generating a user interaction timeline for all of the interactions that occur over a certain time between a user of a bank and the bank or its representatives through any system or device.

Discussion

A bank is a financial institution that is licensed to receive deposits from individuals and organizations and to make loans to those individuals and organizations or others. Banks may also perform other services such as wealth management, currency exchange, etc. Therefore, a bank may have thousands of customers and clients. Depending on the services that a bank provides, it may be classified as a retail bank, a commercial bank, an investment bank or some combination thereof. A retail bank typically provides services such as checking and savings accounts, loan and mortgage services, financing for automobiles, and short-term loans such as overdraft protection. A commercial bank typically provides credit services, cash management, commercial real estate services, employer services, trade finance, etc. An investment bank typically provides corporate clients with complex services and financial transactions such as underwriting and assisting with merger and acquisition activity.

A bank and its representatives interact with the bank's customers and clients through various channels, such as bank branches, customer service call centers, mobile applications, websites, marketing campaigns, etc., for various reasons, such as banking transactions, information gathering, complaints, etc., where the interactions can be client initiated or bank initiated. As with any business, a bank wants to make these interactions with the clients efficient and effective in the name of customer service. Therefore, it may be desirable to collect client interaction data on a timeline to understand why a client took a specific action in order to analyze how those interactions can be improved.

SUMMARY

The following discussion discloses and describes a system for generating a user interaction timeline for all of the interactions that occur over a certain time frame between a user of a bank and the bank or its representatives through any system or device. The system provides an interaction source that stores information and data for each of the interactions between all of the banks users and the bank over all banking channels and a source of data and information that identifies each of the banks users. The system also performs an application sessions process that groups the interactions that each user performs over a particular channel at a certain time frame into an interaction session having a time stamp for that time frame using the information and data for each of the interactions between all of the banks users and the bank over all of the banking channels as they are occurring, and stores the interaction sessions in an interaction session table with previously generated interaction session tables and assigning each table a session ID. The system further performs an application interaction process that aggregates all of the available data and information about each user and the data and information for each interaction by the user with the bank using the information and data for each of the interactions between all of the banks users and the bank over all of the banking channels, the data and information that identifies each of the banks users and the session IDs, and creates an interaction timeline for each user over all of the banking channels for a predetermined time using the aggregated data and information about each user and the data and information for each interaction by the user with the bank.

The features, functions and advantages that have been discussed may be achieved independently in various embodiments of the present disclosure or may be combined in yet other embodiments, further details of which can be seen with reference to the following description and drawings.

DETAILED DESCRIPTION OF THE EMBODIMENTS

Figure 1:
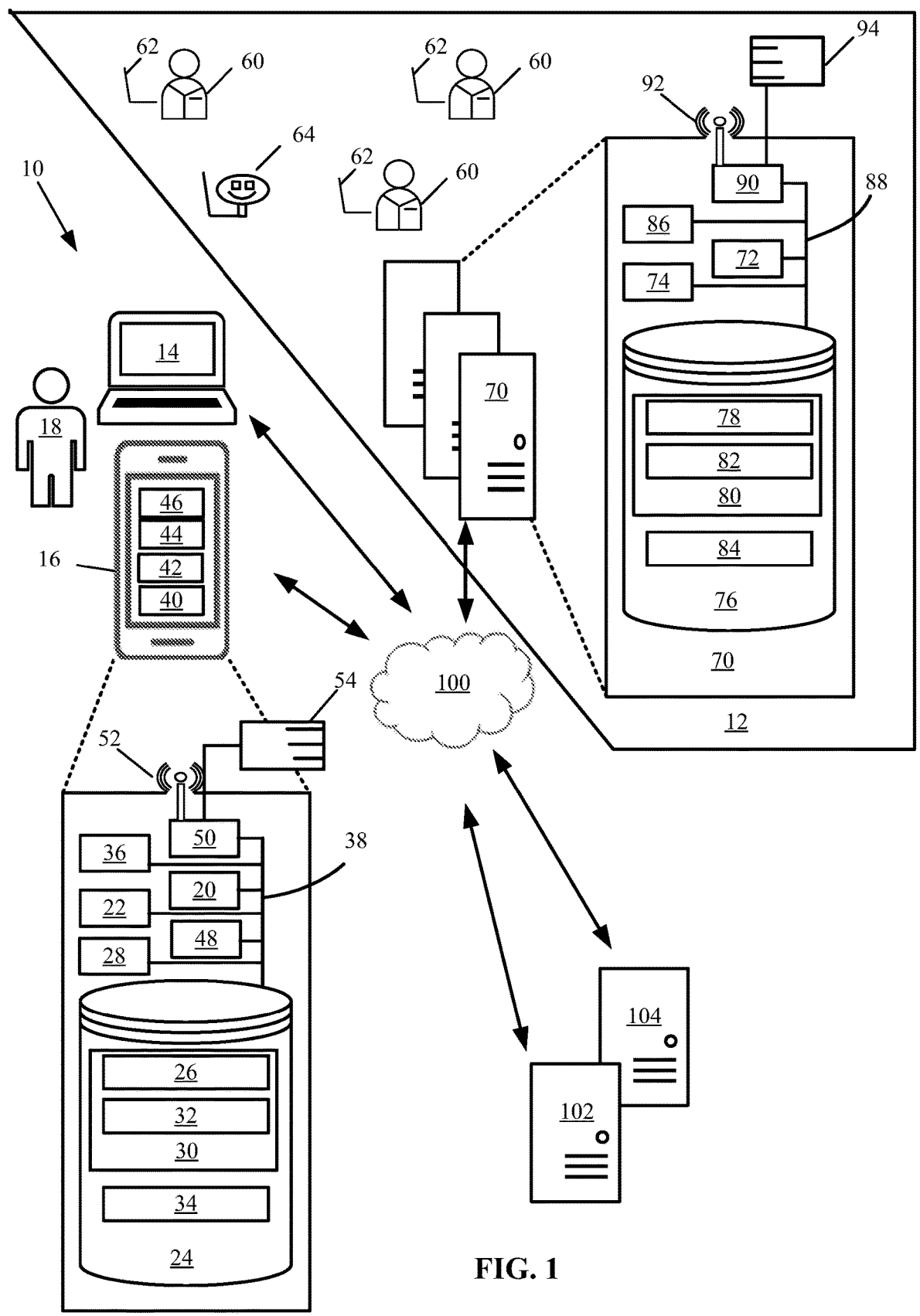
FIG. 1 illustrates a system and environment thereof by which a user benefits through use of services and products of an enterprise system.

The following discussion of the embodiments of the disclosure directed to a system for generating a user interaction timeline for all of the interactions that occur over a certain time between a user of a bank and the bank or its representatives through any system or device is merely exemplary in nature, and is in no way intended to limit the disclosure or its applications or uses.

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the disclosure and enable one of ordinary skill in the art to make, use and practice the disclosure.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present disclosure described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the disclosure. Therefore, it is to be understood that, within the scope of the included claims, the disclosure may be practiced other than as specifically described herein.

FIG. 1 illustrates a system 10, such as a banking system, and environment thereof by which a user 18 benefits through use of services and products of an enterprise system 12. The user 18 accesses services and products by use of one or more user devices, illustrated in separate examples as a computing device 14 and a mobile device 16, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 16 is the system 10 as having exemplary elements, the below descriptions of which apply as well to the computing device 14, which can be, as non-limiting examples, a desktop computer, a laptop computer or other user-accessible computing device.

Furthermore, the user device, referring to either or both of the computing device 14 and the mobile device 16, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 18 can be an individual, a group, or any entity in possession of or having access to the user device, referring to either or both of the computing device 14 and the mobile device 16, which may be personal or public items. Although the user 18 may be singly represented in some drawings, at least in some embodiments according to these descriptions the user 18 is one of many such that a market or community of users, consumers, customers, business entities, government entities, clubs, and groups of any size are all within the scope of these descriptions.

The user device, as illustrated with reference to the mobile device 16, includes components such as at least one of each of a processing device 20, and a memory device 22 for processing use, such as random access memory (RAM), and read-only memory (ROM). The illustrated mobile device 16 further includes a storage device 24 including at least one of a non-transitory storage medium, such as a microdrive, for long-term, intermediate-term, and short-term storage of computer-readable instructions 26 for execution by the processing device 20. For example, the instructions 26 can include instructions for an operating system and various applications or programs 30, of which the application 32 is represented as a particular example. The storage device 24 can store various other data items 34, which can include, as non-limiting examples, cached data, user files such as those for pictures, audio and/or video recordings, files downloaded or received from other devices, and other data items preferred by the user or required or related to any or all of the applications or programs 30.

The memory device 22 is operatively coupled to the processing device 20. As used herein, memory includes any computer readable medium to store data, code, or other information. The memory device 22 may include volatile memory, such as volatile RAM including a cache area for the temporary storage of data. The memory device 22 may also include non-volatile memory, which can be embedded and/or may be removable. The non-volatile memory can additionally or alternatively include an electrically erasable programmable read-only memory (EEPROM), flash memory or the like.

The memory device 22 and the storage device 24 can store any of a number of applications that comprise computer-executable instructions and code executed by the processing device 20 to implement the functions of the mobile device 16 described herein. For example, the memory device 22 may include such applications as a conventional web browser application and/or a mobile P2P payment system client application. These applications also typically provide a graphical user interface (GUI) on a display 40 that allows the user 18 to communicate with the mobile device 16, and, for example, a mobile banking system, and/or other devices or systems. In one embodiment, when the user 18 decides to enroll in a mobile banking program, the user 18 downloads or otherwise obtains the mobile banking system client application from a mobile banking system, for example, the enterprise system 12, or from a distinct application server. In other embodiments, the user 18 interacts with a mobile banking system via a web browser application in addition to, or instead of, the mobile P2P payment system client application.

The processing device 20, and other processors described herein, generally include circuitry for implementing communication and/or logic functions of the mobile device 16. For example, the processing device 20 may include a digital signal processor, a microprocessor, and various analog to digital converters, digital to analog converters, and/or other support circuits. Control and signal processing functions of the mobile device 16 are allocated between these devices according to their respective capabilities. The processing device 20 thus may also include the functionality to encode and interleave messages and data prior to modulation and transmission. The processing device 20 can additionally include an internal data modem. Further, the processing device 20 may include functionality to operate one or more software programs, which may be stored in the memory device 22, or in the storage device 24. For example, the processing device 20 may be capable of operating a connectivity program, such as a web browser application. The web browser application may then allow the mobile device 16 to transmit and receive web content, such as, for example, location-based content and/or other web page content, according to a wireless application protocol (WAP), hypertext transfer protocol (HTTP), and/or the like.

The memory device 22 and the storage device 24 can each also store any of a number of pieces of information, and data, used by the user device and the applications and devices that facilitate functions of the user device, or are in communication with the user device, to implement the functions described herein and others not expressly described. For example, the storage device 24 may include such data as user authentication information, etc.

The processing device 20, in various examples, can operatively perform calculations, can process instructions for execution and can manipulate information. The processing device 20 can execute machine-executable instructions stored in the storage device 24 and/or the memory device 22 to thereby perform methods and functions as described or implied herein, for example, by one or more corresponding flow charts expressly provided or implied as would be understood by one of ordinary skill in the art to which the subject matters of these descriptions pertain. The processing device 20 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 20, while in other embodiments methods and functions described herein include cloud-based computing in whole or in part such that the processing device 20 facilitates local operations including, as non-limiting examples, communication, data transfer, and user inputs and outputs such as receiving commands from and providing displays to the user.

The mobile device 16, as illustrated, includes an input and output system 36, referring to, including, or operatively coupled with, user input devices and user output devices, which are operatively coupled to the processing device 20. The user output devices include the display 40 (e.g., a liquid crystal display or the like), which can be, as a non-limiting example, a touch screen of the mobile device 16, which serves both as an output device, by providing graphical and text indicia and presentations for viewing by one or more of the users 18, and as an input device, by providing virtual buttons, selectable options, a virtual keyboard, and other indicia that, when touched, control the mobile device 16 by user action. The user output devices include a speaker 44 or other audio device. The user input devices, which allow the mobile device 16 to receive data and actions such as button manipulations and touches from a user such as the user 18, may include any of a number of devices allowing the mobile device 16 to receive data from a user, such as a keypad, keyboard, touch-screen, touchpad, microphone 42, mouse, joystick, other pointer device, button, soft key, and/or other input device(s). The user interface may also include a camera 46, such as a digital camera.

Further non-limiting examples include one or more of each, any and all of a wireless or wired keyboard, a mouse, a touchpad, a button, a switch, a light, an LED, a buzzer, a bell, a printer and/or other user input devices and output devices for use by or communication with the user 18 in accessing, using, and controlling, in whole or in part, the user device, referring to either or both of the computing device 14 and the mobile device 16. Inputs by one or more of the users 18 can thus be made via voice, text or graphical indicia selections. For example, such inputs in some examples correspond to user-side actions and communications seeking services and products of the enterprise system 12, and at least some outputs in such examples correspond to data representing enterprise-side actions and communications in two-way communications between the user 18 and the enterprise system 12.

The mobile device 16 may also include a positioning system device 48, which can be, for example, a global positioning system (GPS) device configured to be used by a positioning system to determine a location of the mobile device 16. For example, the positioning system device 48 may include a GPS transceiver. In some embodiments, the positioning system device 48 includes an antenna, transmitter, and receiver. For example, in one embodiment, triangulation of cellular signals may be used to identify the approximate location of the mobile device 16. In other embodiments, the positioning device 48 includes a proximity sensor or transmitter, such as an RFID tag, that can sense or be sensed by devices known to be located proximate a merchant or other location to determine that the consumer mobile device 16 is located proximate these known devices.

In the illustrated example, a system intraconnect 38, connects, for example electrically, the various described, illustrated, and implied components of the mobile device 16. The intraconnect 38, in various non-limiting examples, can include or represent, a system bus, a high-speed interface connecting the processing device 20 to the memory device 22, individual electrical connections among the components, and electrical conductive traces on a motherboard common to some or all of the above-described components of the user device. As discussed herein, the system intraconnect 38 may operatively couple various components with one another, or in other words, electrically connects those components, either directly or indirectly—by way of intermediate component(s)—with one another.

The user device, referring to either or both of the computing device 14 and the mobile device 16, with particular reference to the mobile device 16 for illustration purposes, includes a communication interface 50, by which the mobile device 16 communicates and conducts transactions with other devices and systems. The communication interface 50 may include digital signal processing circuitry and may provide two-way communications and data exchanges, for example, wirelessly via wireless communication device 52, and for an additional or alternative example, via wired or docked communication by mechanical electrically conductive connector 54. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 52, which can be or include a radio-frequency transceiver, a Bluetooth device, Wi-Fi device, a near-field communication device, and other transceivers. In addition, GPS may be included for navigation and location-related data exchanges, ingoing and/or outgoing. Communications may also or alternatively be conducted via the connector 54 for wired connections such by USB, Ethernet, and other physically connected modes of data transfer.

The processing device 20 is configured to use the communication interface 50 as, for example, a network interface to communicate with one or more other devices on a network. In this regard, the communication interface 50 utilizes the wireless communication device 52 as an antenna operatively coupled to a transmitter and a receiver (together a "transceiver") included with the communication interface 50. The processing device 20 is configured to provide signals to and receive signals from the transmitter and receiver, respectively. The signals may include signaling information in accordance with the air interface standard of the applicable cellular system of a wireless telephone network. In this regard, the mobile device 16 may be configured to operate with one or more air interface standards, communication protocols, modulation types, and access types. By way of illustration, the mobile device 16 may be configured to operate in accordance with any of a number of first, second, third, fourth or fifth-generation communication protocols and/or the like. For example, the mobile device 16 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as universal mobile telecommunications System (UMTS), CDMA2000, wideband CDMA (WCDMA) and/or time division-synchronous CDMA (TD-SCDMA), with fourth-generation (4G) wireless communication protocols such as long-term evolution (LTE), fifth-generation (5G) wireless communication protocols, Bluetooth low energy (BLE) communication protocols such as Bluetooth 5.0, ultra-wideband (UWB) communication protocols, and/or the like. The mobile device 16 may also be configured to operate in accordance with non-cellular communication mechanisms, such as via a wireless local area network (WLAN) or other communication/data networks.

The communication interface 50 may also include a payment network interface. The payment network interface may include software, such as encryption software, and hardware, such as a modem, for communicating information to and/or from one or more devices on a network. For example, the mobile device 16 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 16 further includes a power source 28, such as a battery, for powering various circuits and other devices that are used to operate the mobile device 16. Embodiments of the mobile device 16 may also include a clock or other timer configured to determine and, in some cases, communicate actual or relative time to the processing device 20 or one or more other devices. For a further example, the clock may facilitate timestamping transmissions, receptions, and other data for security, authentication, logging, polling, data expiry and forensic purposes.

The system 10 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 12 can offer any number or type of services and products to one or more of the users 18. In some examples, the enterprise system 12 offers products, and in some examples, the enterprise system 12 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests and credit scores.

To provide access to, or information regarding, some or all the services and products of the enterprise system 12, automated assistance may be provided by the enterprise system 12. For example, automated access to user accounts and replies to inquiries may be provided by enterprise-side automated voice, text, and graphical display communications and interactions. In at least some examples, any number of human agents 60, can be employed, utilized, authorized or referred by the enterprise system 12. Such human agents 60 can be, as non-limiting examples, point of sale or point of service (POS) representatives, online customer service assistants available to the users 18, advisors, managers, sales team members, and referral agents ready to route user requests and communications to preferred or particular other agents, human or virtual.

The human agents 60 may utilize agent devices 62 to serve users in their interactions to communicate and take action. The agent devices 62 can be, as non-limiting examples, computing devices, kiosks, terminals, smart devices such as phones, and devices and tools at customer service counters and windows at POS locations. In at least one example, the diagrammatic representation of the components of the mobile device 16 in FIG. 1 applies as well to one or both of the computing device 14 and the agent devices 62.

The agent devices 62 individually or collectively include input devices and output devices, including, as non-limiting examples, a touch screen, which serves both as an output device by providing graphical and text indicia and presentations for viewing by one or more of the agents 60, and as an input device by providing virtual buttons, selectable options, a virtual keyboard, and other indicia that, when touched or activated, control or prompt the agent device 62 by action of the attendant agent 60. Further non-limiting examples include, one or more of each, any, and all of a keyboard, a mouse, a touchpad, a joystick, a button, a switch, a light, an LED, a microphone serving as input device for example for voice input by the human agent 60, a speaker serving as an output device, a camera serving as an input device, a buzzer, a bell, a printer and/or other user input devices and output devices for use by or communication with the human agent 60 in accessing, using, and controlling, in whole or in part, the agent device 62.

Inputs by one or more of the human agents 60 can thus be made via voice, text or graphical indicia selections. For example, some inputs received by the agent device 62 in some examples correspond to, control, or prompt enterprise-side actions and communications offering services and products of the enterprise system 12, information thereof, or access thereto. At least some outputs by the agent device 62 in some examples correspond to, or are prompted by, user-side actions and communications in two-way communications between the user 18 and an enterprise-side human agent 60.

From a user perspective experience, an interaction in some examples within the scope of these descriptions begins with direct or first access to one or more of the human agents 60 in person, by phone or online for example via a chat session or website function or feature. In other examples, a user is first assisted by a virtual agent 64 of the enterprise system 12, which may satisfy user requests or prompts by voice, text or online functions, and may refer users to one or more of the human agents 60 once preliminary determinations or conditions are made or met.

The enterprise system 12 includes a computing system 70 having various components, such as a processing device 72 and a memory device 74 for processing use, such as random access memory (RAM) and read-only memory (ROM). The computing system 70 further includes a storage device 76 having at least one non-transitory storage medium, such as a microdrive, for long-term, intermediate-term, and short-term storage of computer-readable instructions 78 for execution by the processing device 72. For example, the instructions 78 can include instructions for an operating system and various applications or programs 80, of which an application 82 is represented as a particular example. The storage device 76 can store various other data 84, which can include, as non-limiting examples, cached data, and files such as those for user accounts, user profiles, account balances, and transaction histories, files downloaded or received from other devices, and other data items preferred by the user or required or related to any or all of the applications or programs 80.

The computing system 70, in the illustrated example, also includes an input/output system 86, referring to, including, or operatively coupled with input devices and output devices such as, in a non-limiting example, agent devices 62, which have both input and output capabilities.

In the illustrated example, a system intraconnect 88 electrically connects the various above-described components of the computing system 70. In some cases, the intraconnect 88 operatively couples components to one another, which indicates that the components may be directly or indirectly connected, such as by way of one or more intermediate components. The intraconnect 88, in various non-limiting examples, can include or represent, a system bus, a high-speed interface connecting the processing device 72 to the memory device 74, individual electrical connections among the components, and electrical conductive traces on a motherboard common to some or all of the above-described components of the user device.

The computing system 70 includes a communication interface 90 by which the computing system 70 communicates and conducts transactions with other devices and systems. The communication interface 90 may include digital signal processing circuitry and may provide two-way communications and data exchanges, for example wirelessly via wireless device 92, and for an additional or alternative example, via wired or docked communication by mechanical electrically conductive connector 94. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 92, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 94 for wired connections such as by USB, Ethernet, and other physically connected modes of data transfer.

The processing device 72, in various examples, can operatively perform calculations, can process instructions for execution, and can manipulate information. The processing device 72 can execute machine-executable instructions stored in the storage device 76 and/or the memory device 74 to thereby perform methods and functions as described or implied herein, for example by one or more corresponding flow charts expressly provided or implied as would be understood by one of ordinary skill in the art to which the subjects matters of these descriptions pertain. The processing device 72 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing system 70, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 16 and the computing device 14, the agent devices 62 and the computing system 70, which may be one or any number centrally located or distributed, are in communication through one or more networks, referenced as system 10 in FIG. 1.

The network 100 provides wireless or wired communications among the components of the network 100 and the environment thereof, including other devices local or remote to those illustrated, such as additional mobile devices, servers, and other devices communicatively coupled to the network 100, including those not illustrated in FIG. 1. The network 100 is singly depicted for illustrative convenience, but may include more than one network without departing from the scope of these descriptions. In some embodiments, the network 100 may be or provide one or more cloud-based services or operations. The network 100 may be or include an enterprise or secured network, or may be implemented, at least in part, through one or more connections to the Internet. A portion of the network 100 may be a virtual private network (VPN) or an Intranet. The network 100 can include wired and wireless links, including, as non-limiting examples, 802.11a/b/g/n/ac, 802.20, WiMax, LTE, and/or any other wireless link. The network 100 may include any internal or external network, networks, sub-network, and combinations of such operable to implement communications between various computing components within and beyond the network 100. The network 100 may communicate, for example, internet protocol (IP) packets, frame relay frames, asynchronous transfer mode (ATM) cells, voice, video, data, and other suitable information between network addresses. The network 100 may also include one or more local area networks (LANs), radio access networks (RANs), metropolitan area networks (MANs), wide area networks (WANs), all or a portion of the internet and/or any other communication system or systems at one or more locations.

Two external systems 102 and 104 are illustrated in FIG. 1 and representing any number and variety of data sources, users, consumers, customers, business entities, banking systems, government entities, clubs, and groups of any size are all within the scope of the descriptions. In at least one example, the external systems 102 and 104 represent automatic teller machines (ATMs) utilized by the enterprise system 12 in serving the users 18. In another example, the external systems 102 and 104 represent payment clearinghouse or payment rail systems for processing payment transactions, and in another example, the external systems 102 and 104 represent third party systems such as merchant systems configured to interact with the user device 16 during transactions and also configured to interact with the enterprise system 12 in back-end transactions clearing processes.

In certain embodiments, one or more of the systems such as the user device 16, the enterprise system 12, and/or the external systems 102 and 104 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms and modules are used at least in part in implementing artificial intelligence (AI) functions, systems and methods.

Artificial Intelligence and/or machine learning programs may be associated with or conducted by one or more processors, memory devices, and/or storage devices of a computing system or device. It should be appreciated that the artificial intelligence algorithm or program may be incorporated within the existing system architecture or be configured as a standalone modular component, controller, or the like communicatively coupled to the system. An artificial intelligence program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input.

Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

The artificial intelligence systems and structures discussed herein may employ deep learning. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output.

Figure 2:
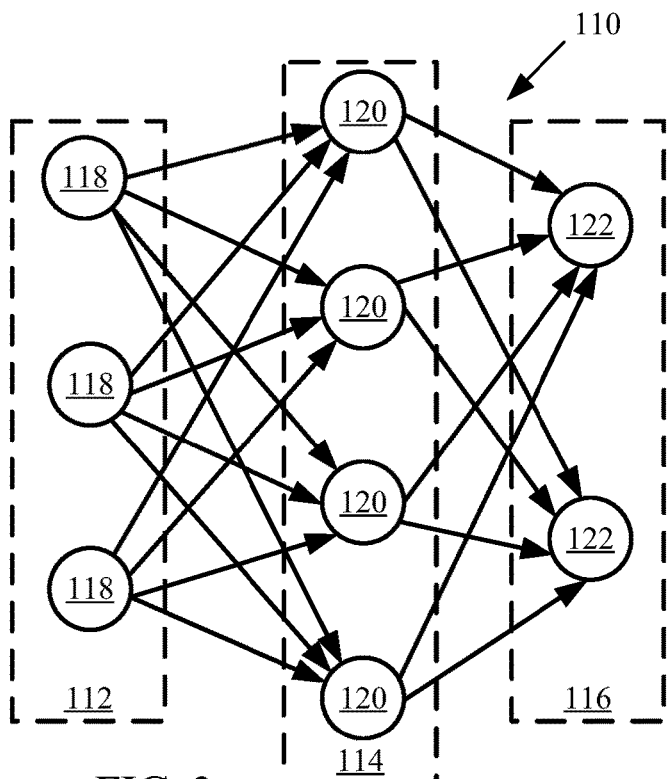
FIG. 2 is a diagram of a feedforward network.

FIG. 2 illustrates a feedforward neural network 110 that includes a hidden layer 114 between an input layer 112 and an output layer 116. The input layer 112, having nodes commonly referenced in FIG. 2 as input nodes 118 for convenience, communicates input data, variables, matrices, or the like to the hidden layer 114, having nodes 120. The hidden layer 114 generates a representation and/or transformation of the input data into a form that is suitable for generating output data. Adjacent layers of the neural network 110 are connected at the edges of the nodes of the respective layers, but nodes within a layer typically are not separated by an edge. In at least one embodiment of such a feedforward neural network, data is communicated to the nodes 118 of the input layer 112, which then communicates the data to the hidden layer 114. The hidden layer 114 may be configured to determine the state of the nodes in the respective layers and assign weight coefficients or parameters of the nodes based on the edges separating each of the layers, such as an activation function implemented between the input data communicated from the input layer 112 and the output data communicated to nodes 122 of the output layer 116. It should be appreciated that the form of the output from the neural network may generally depend on the type of model represented by the algorithm. Although the feedforward neural network 110 expressly includes a single hidden layer, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained, for example, utilizing a training data set, prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount, such as a value between −1 and 1, may be used to modify the previous coefficient, e.g., a propagated value. The machine learning algorithm may be considered sufficiently trained when the associated error amount for the output data is less than the predetermined, acceptable level, for example, each data point within the output layer includes an error amount less than the predetermined, acceptable level. Thus, the parameters determined from the training process can be utilized with new input data to categorize, classify, and/or predict other values based on the new input data.

An additional or alternative type of neural network suitable for use in a machine learning program and/or module is a convolutional neural network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 3:
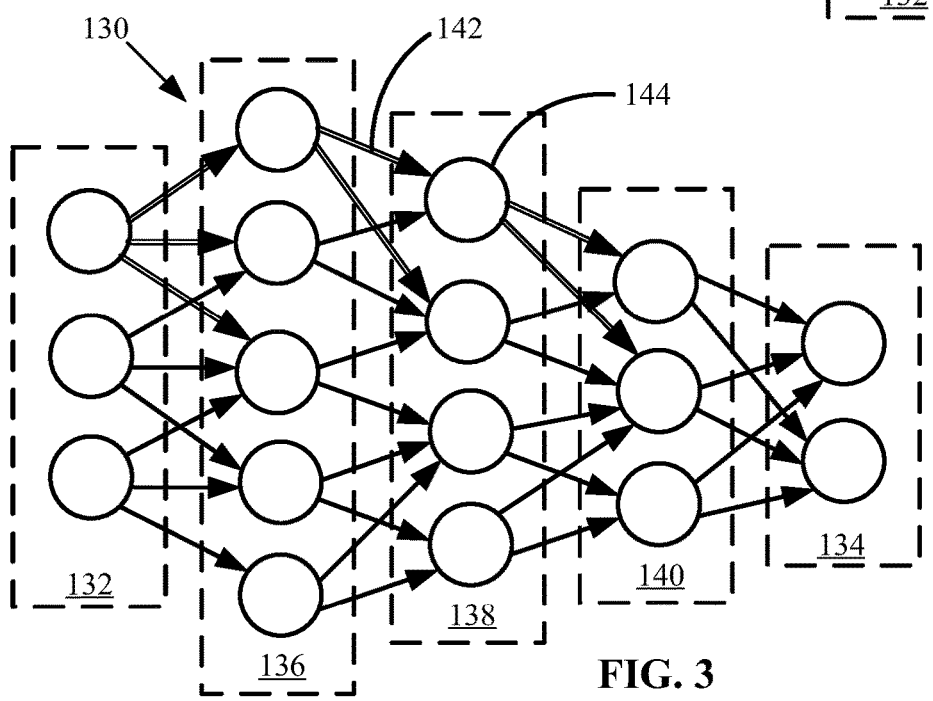
FIG. 3 is a diagram of a convolutional neural network (CNN)

FIG. 3 is an illustration of an exemplary CNN 130 that includes an input layer 132 and an output layer 134. However, where the single hidden layer 114 is provided in the network 110, multiple consecutive hidden layers 136, 138 and 140 are provided in the CNN 130. Edge neurons 142 represented by white-filled arrows highlight that hidden layer nodes 144 can be connected locally, such that not all of the nodes of succeeding layers are connected by neurons.

Figure 4:
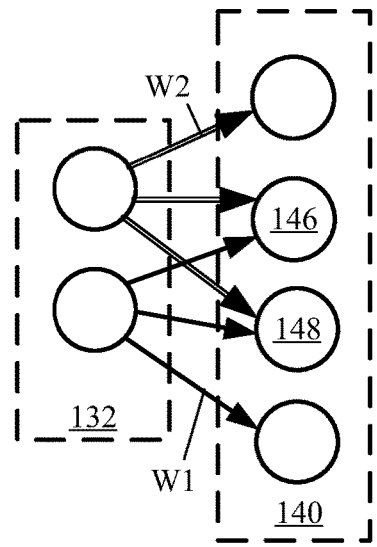
FIG. 4 is a diagram of a portion of the CNN shown in FIG. 3 illustrating assigned weights at connections or neurons.

FIG. 4 shows a portion of the CNN 130, specifically portions of the input layer 132 and the first hidden layer 136, and illustrates that connections can be weighted. In the illustrated example, labels W1 and W2 refer to respective assigned weights for the referenced connections. The two hidden nodes 146 and 148 share the same set of weights W1 and W2 when connecting to two local patches.

Figure 5:
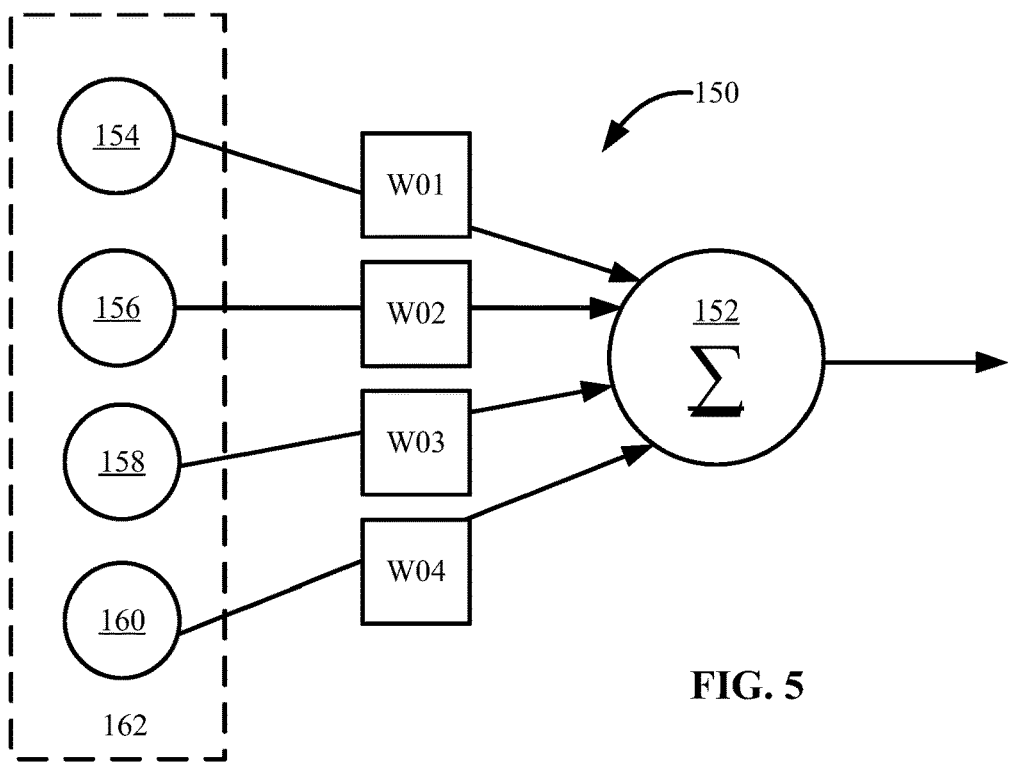
FIG. 5 is a diagram representing an exemplary weighted sum computation in a node in an artificial neural network.

A weight defines the impact a node in any given layer has on computations by a connected node in the next layer. FIG. 5 shows a network 150 including a node 152 in a hidden layer. The node 152 is connected to several nodes in the previous layer representing inputs to the node 152. Input nodes 154, 156, 158 and 160 in an input layer 162 are each assigned a respective weight W01, W02, W03, and W04 in the computation at the node 152, which in this example is a weighted sum.

An additional or alternative type of feedforward neural network suitable for use in the machine learning program and/or module is a recurrent neural network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

Figure 6:
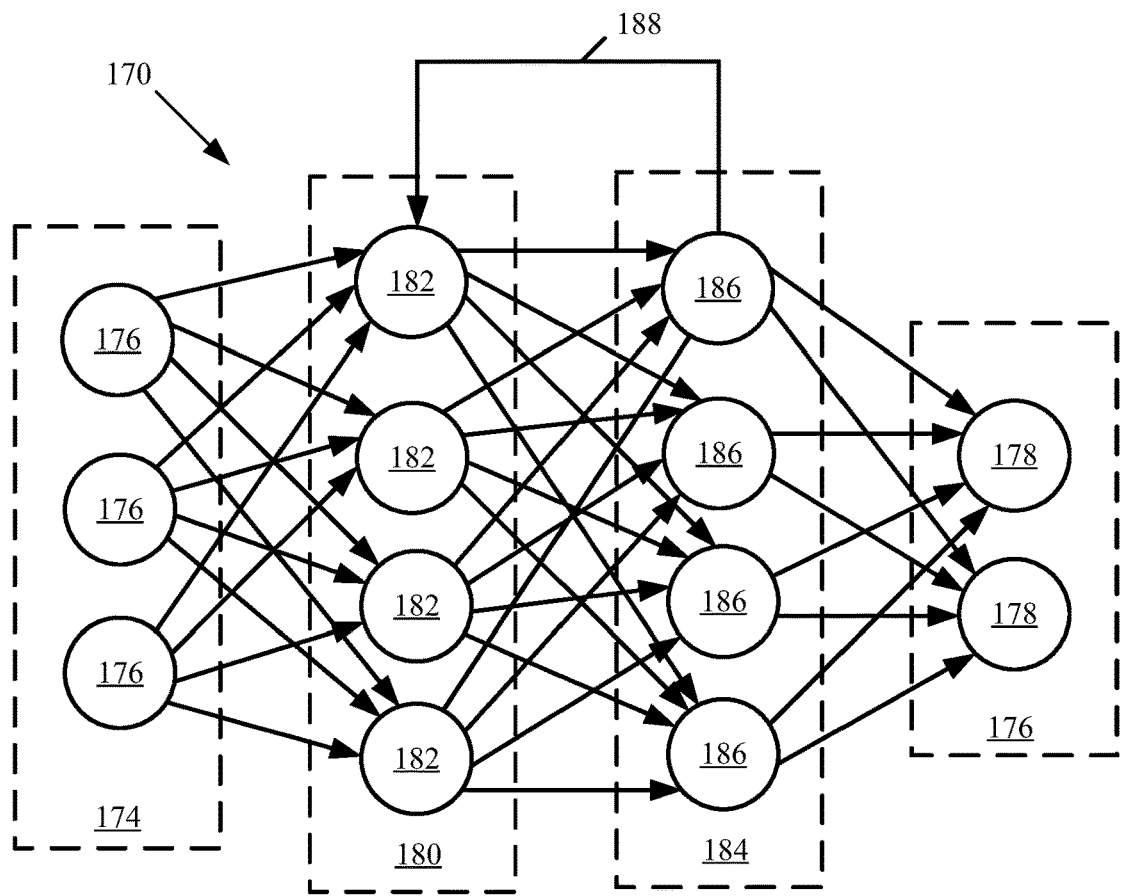
FIG. 6 is a diagram of a recurrent neural network (RNN) utilized in machine learning.

FIG. 6 illustrates an RNN 170 that includes an input layer 172 with nodes 174, an output layer 176 with nodes 178, and multiple consecutive hidden layers 180 and 182 with nodes 184 and nodes 186, respectively. The RNN 170 also includes a feedback connector 188 configured to communicate parameter data from at least one of the nodes 186 in the second hidden layer 184 to at least one of the nodes 182 in the first hidden layer 184. It should be appreciated that two or more and up to all of the nodes of a subsequent layer may provide or communicate a parameter or other data to a previous layer of the RNN 170. Moreover and in some embodiments, the RNN 170 may include multiple feedback connectors, such as connectors suitable to communicatively couple pairs of nodes and/or connector systems configured to provide communication between three or more nodes. Additionally or alternatively, the feedback connector 188 may communicatively couple two or more nodes having at least one hidden layer between them, i.e., nodes of non-sequential layers of the RNN 170.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Figure 7:
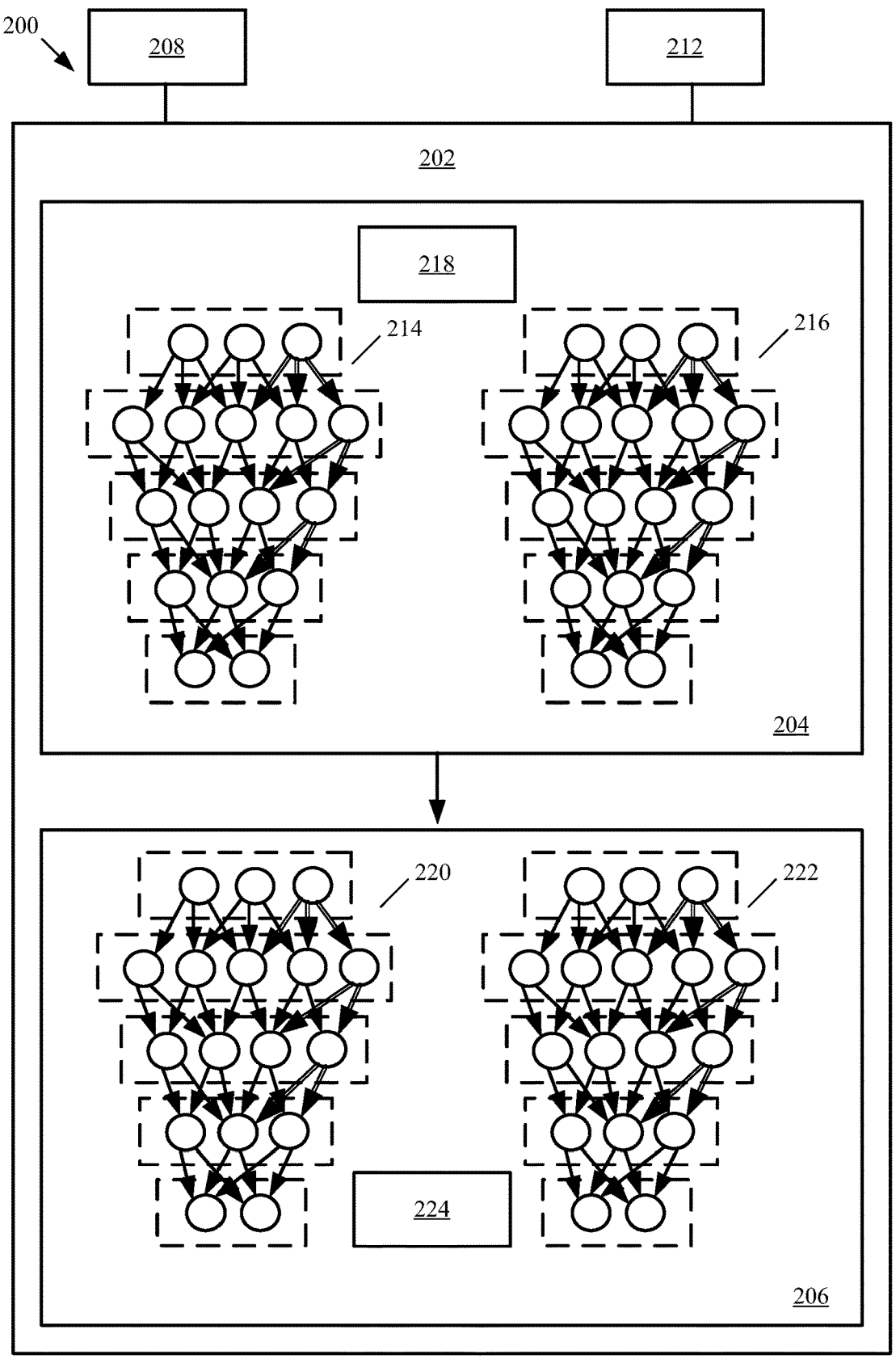
FIG. 7 is a schematic logic diagram of an artificial intelligence processor operating an artificial intelligence program.

FIG. 7 is a block diagram of an artificial intelligence programming system 200 including an AI processor 202, such as a dedicated processing device, that operates an artificial intelligence program, where the processor 202 includes a front-end sub-processor 204 and a back-end sub-processor 206. The algorithms associated with the front-end sub-processor 204 and the back-end sub-processor 206 may be stored in an associated memory device and/or storage device, such as memory device 208 communicatively coupled to the AI processor 202, as shown. Additionally, the system 200 may include a memory 212 storing one or more instructions necessary for operating the AI program. In this embodiment, the sub-processor 204 includes neural networks 214 and 216 operating an AI algorithm 218, such as feature recognition, and the sub-processor 206 includes neural networks 220 and 222 operating an AI algorithm 224 to perform an operation on the data set communicated directly or indirectly to the sub-processor 206.

The system 200 may provide statistical models or machine learning programs such as decision tree learning, associate rule learning, recurrent artificial neural networks, support vector machines, and the like. In various embodiments, the sub-processor 204 may be configured to include built in training and inference logic or suitable software to train the neural network prior to use, for example, machine learning logic including, but not limited to, image recognition, mapping and localization, autonomous navigation, speech synthesis, document imaging, or language translation. For example, the sub-processor 204 may be used for image recognition, input categorization, and/or support vector training. In various embodiments, the sub-processor 206 may be configured to implement input and/or model classification, speech recognition, translation, and the like.

For instance and in some embodiments, the system 200 may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set. For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the system 200 may be trained using a semi-supervised learning process in which some but not all of the output data is known, e.g., a mix of labeled and unlabeled data having the same distribution.

In some embodiments, the system 200 may include an index of basic operations, subroutines, and the like (primitives) typically implemented by AI and/or machine learning algorithms. Thus, the system 200 may be configured to utilize the primitives of the processor 202 to perform some or all of the calculations required by the system 200. Primitives suitable for inclusion in the processor 202 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., logistic regression (LR), Naive-Bayes, random forest (RF), matrix factorization, and support vector machines) in addition to, or as an alternative to, one or more neural networks, as described herein.

Figure 8:
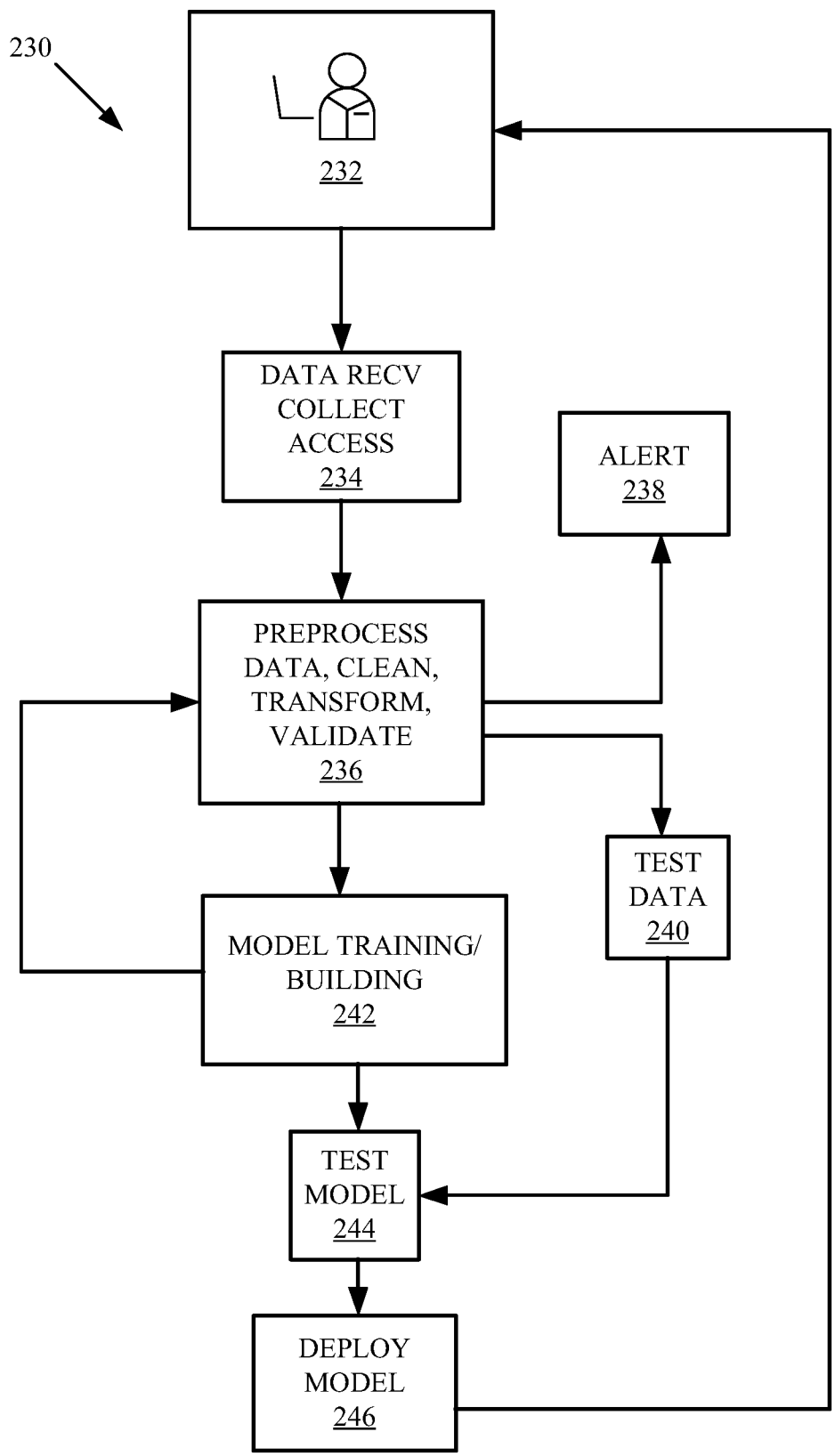
FIG. 8 is a flow chart showing a method for model development and deployment by machine learning.

FIG. 8 is a flow chart diagram 230 showing an exemplary method for model development and deployment by machine learning. The method represents at least one example of a machine learning workflow in which steps are implemented in a machine learning project. At box 232, a user authorizes, requests, manages, or initiates the machine-learning workflow. This may represent a user such as human agent, or customer, requesting machine-learning assistance or AI functionality to simulate intelligent behavior, such as a virtual agent, or other machine-assisted or computerized tasks that may, for example, entail visual perception, speech recognition, decision-making, translation, forecasting, predictive modelling, and/or suggestions as non-limiting examples. In a first iteration from the user perspective, the box 232 can represent a starting point. However, with regard to continuing or improving an ongoing machine learning workflow, the box 232 can represent an opportunity for further user input or oversight via a feedback loop.

At box 234, data is received, collected, accessed or otherwise acquired and entered as can be termed data ingestion. At box 236, data ingested from the box 234 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing is updated with newly ingested data, an updated model will be generated. The process at the box 236 can include data validation, which focuses on confirming that the statistics of the ingested data are as expected, such as that data values are within expected numerical ranges, that data sets are within any expected or required categories, and that data comply with any needed distributions such as within those categories. The process can proceed to box 238 to automatically alert the initiating user, other human or virtual agents, and/or other systems, if any anomalies are detected in the data, thereby pausing or terminating the process flow until corrective action is taken.

At box 240, training test data, such as a target variable value, is inserted into an iterative training and testing loop. At box 242, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison at box 244, where the model is tested. Subsequent iterations of the model training at the box 242 may be conducted with updated weights in the calculations.

When compliance and/or success in the model testing at the box 244 is achieved, the process proceeds to box 246, where model deployment is triggered. The model may be utilized in AI functions and programming, for example, to simulate intelligent behavior, to perform machine-assisted or computerized tasks, of which visual perception, speech recognition, decision-making, translation, forecasting, predictive modelling, and/or automated suggestion generation serve as non-limiting examples.

Figure 9:
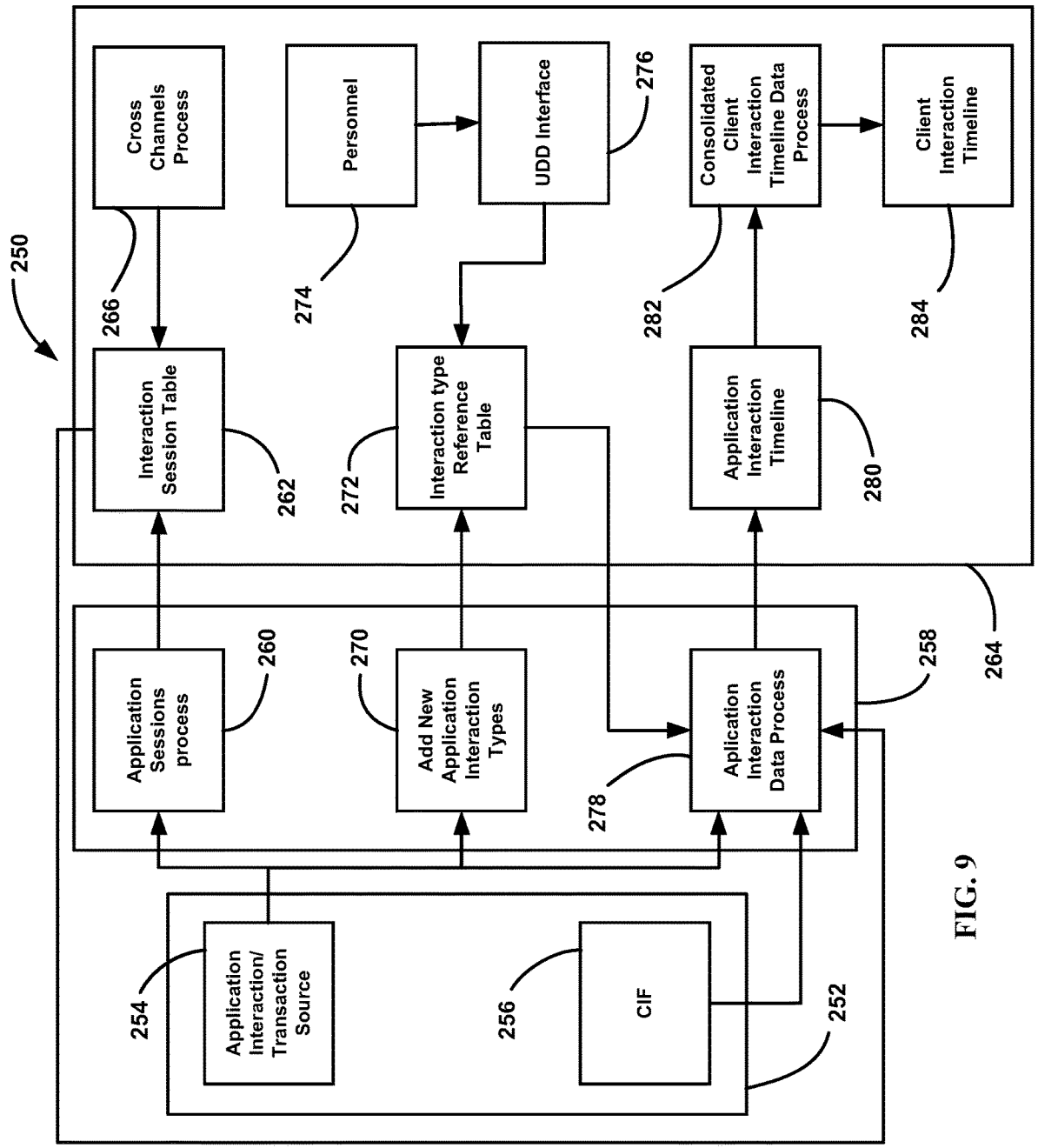
FIG. 9 is a flow diagram showing data flow for generating a bank client interaction timeline.

FIG. 9 is a flow diagram 250 showing data flow for generating a client interaction timeline, where the client is a customer of a bank. As used herein, an interaction is any event or action that occurs between a client of the bank and the bank or its representatives through any system or device, a channel is a specific connection point for that interaction, such as a website, mobile applications, branch banking, online banking, customer service center calls, etc., and the interaction timeline is a series of those interactions for a specific client over a certain time. The various processes and systems discussed below may be or use some of the devices, algorithms and processes discussed above.

The diagram 250 includes an enterprise data lake (EDL) section 252 having a plurality of sources of client data and information. One of those sources is a client application interaction/transaction source identified at box 254 that stores information and data in a useable format obtained for each of the interactions between all of the banks clients and the bank over all of the banking channels. Another one of those sources is a customer information file (CIF) at box 256, which is a client master database that stores identifying data and information, such as name, address, etc., for all of the clients of the bank.

The diagram 250 also includes a process section 258 having a number of data processes that use and consume data from the data sources in the section 252. The processes in the section 258 include an application sessions process at box 260 that receives the information and data for each of the interactions between all of the banks clients and the bank over all of the banking channels from the source 254 as they are occurring and groups the interactions that the clients perform over a particular channel at a certain time frame into an interaction session having a time stamp for that time frame. Each generated interaction session is stored in an interaction session table at box 262 in a client analytics repository (CAR) 264 with previously generated interaction session tables and each table is assigned a session ID, where the CAR 264 is an architecture that stores and analyzes information about the bank's clients for various reasons, such as marketing, quality control, etc. Each generated interaction session table at the box 262 is linked to any other interaction that occurs by a particular client within the time frame over a different channel using a cross channels process at box 266 in the CAR 264, where the session ID identifies the cross channel interaction. For example, if a client attempts to perform an online banking process and runs into problems and then calls the customer service center to address those problems, those interactions over more than one channel are linked and analyzed to help prevent such issues going forward.

The processes in the section 258 also include an add new interaction type process at box 270 that also receives the data and information from the source 254 and operates to identify new or different interactions performed by a client that may be added to the interactions performed by a particular client, such as performing a different operation during online banking by the client. Those new features or interactions are assigned a new interaction type code, which is stored in an interaction type reference table at box 272 in the CAR 264. A bank employee or the client shown as box 274 can input descriptive and classification information about the client to be linked to particular reference tables for that client to further aggregate information through a user defined data (UDD) interface at box 276 in the CAR 264.

The processes in the section 258 also include an application interaction data process at box 278 that receives data and information from the source 254, receives the client files from the box 256, receives the session IDs from the box 262 and receives the interaction type IDs from the box 272. The application interaction data process operates to aggregate all of the available data and information about each client and the data and information for each interaction by the client with the bank. Those client interactions are stored on a timeline based on when they occur at box 280 in the CAR 264 and then those interactions are consolidated for a certain period of time, such as six months, at box 282 to generate a client interaction timeline for each client over all of the channels at box 284. The application interaction data process at the box 278 may employ machine learning. As discussed above, machine learning is a type of artificial intelligence that allows various software applications to become more accurate at predicting outcomes without being explicitly programmed to do so, where the machine learning algorithms use historical data as an input to predict new output values. The machine learning processors used for this purpose can employ some or all of the various neural network types discussed above, such as CNNs and RNNs. Nodes in those neural networks would be weighted and trained for the client interaction timeline purpose discussed herein, where the neural networks would learn more about generating client interaction timelines as more are generated.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for generating a user interaction timeline for all interactions that occur over a certain time between users of an entity and the entity or entity representatives through any system or device, said system comprising:
   means for providing an interaction source that stores information and data for each of the interactions between all of the users of the entity and the entity over all entity channels;
   means for providing a source of data and information that identifies each of the users of the entity;
   means for performing an application sessions process that groups the interactions that each user of the entity performs over a particular channel at a certain time frame into an interaction session having a time stamp for that time frame using the information and data for each of the interactions between all of the users of the entity and the entity over all of the entity channels as the interactions are occurring;
   means for storing the interaction sessions in an interaction session table with previously generated interaction session tables and assigning each session table a different session identifications (IDs);
   means for performing an application interaction process that aggregates all of the available data and information about each user of the entity and the data and information for each interaction by the user of the entity with the entity using the information and data for each of the interactions between all of the users of the entity and the entity over all of the entity channels, the data and information that identifies each of the users of the entity and the session IDs, wherein the means for performing an application interaction process uses at least one neural network having nodes that have been trained to perform the application interaction process;
   means for creating an interaction timeline for each user of the entity over all of the entity channels for a predetermined time using the aggregated data and information about each user of the entity and the data and information for each interaction by the user of the entity with the entity;
   means for performing a new interaction type process to identify new or different interactions by the users of the entity using the information and data for each of the interactions between all of the users of the entity and the entity over all of the entity channels as they are occurring; and means for assigning a new interaction type code to the new or different interactions and storing the new interaction type codes in a reference table, wherein the means for performing the application interaction process uses the new interaction type codes.

2. The system according to claim 1 further comprising means for linking descriptive and classification information about the users of the entity to the reference table.

3. The system according to claim 1 further comprising means for linking interactions by the users of the entity over other entity channels to the interaction sessions in the interaction session table.

4. The system according to claim 1 wherein the at least one neural network is a convolutional neural network (CNN) or a recurrent neural network (RNN).

5. The system according to claim 1 wherein the entity channels include a website, mobile applications, branch banking, online banking and customer service center calls.

6. The system according to claim 1 wherein the predetermined time for the timeline is six months.

7. A system for generating a user interaction timeline for all interactions that occur over a certain time between users of an entity and the entity or entity representatives through any device, said system comprising:
  a back-end server including:
    at least one processor for processing data and information;
    a communications interface communicatively coupled to the at least one processor; and
    a memory device storing data and executable code that, when executed, causes the at least one processor to:
      provide an interaction source that stores information and data for each of the interactions between all of the users of the entity and the entity over all entity channels;
      provide a source of data and information that identifies each of the users of the entity;
      perform an application sessions process that groups the interactions that each user of the entity performs over a particular channel at a certain time frame into an interaction session having a time stamp for that time frame using the information and data for each of the interactions between all of the users of the entity and the entity over all of the entity channels as they are occurring;
      store the interaction sessions in an interaction session table with previously generated interaction session tables and assigning each session table a session identifications (IDs);
      perform a new interaction type process to identify new or different interactions by the users of the entity using the information and data for each of the interactions between all of the users of the entity and the entity over all of the entity channels as the interactions are occurring, and assigning a new interaction type code to the new or different interactions;
      store the new type codes in a reference table;
      perform an application interaction process that aggregates all of the available data and information about each user of the entity and the data and information for each interaction by the user of the entity with the entity using the information and data for each of the interactions between all of the users of the entity and the entity over all of the entity channels, the data and information that identifies each of the users of the entity, the session IDs and the new interaction type codes, wherein performing an application interaction process includes using at least one neural network having nodes that have been trained to perform the application interaction process; and
      create an interaction timeline for each user of the entity over all of the entity channels for a predetermined time using the aggregated data and information about each user of the entity and the data and information for each interaction by the user of the entity with the entity.

8. The system according to claim 7 wherein the at least one processor also links descriptive and classification information about the users of the entity to the reference table.

9. The system according to claim 7 wherein the at least one processor also links interactions by users of the entity over other entity channels to the interaction sessions in the interaction session table.

10. The system according to claim 7 wherein the at least one neural network is a convolutional neural network (CNN) or a recurrent neural network (RNN).

11. The system according to claim 7 wherein the entity channels include a website, mobile applications, branch banking, online banking and customer service center calls.

12. The system according to claim 7 wherein the predetermined time for the timeline is six months.

13. A system for generating a user interaction timeline for all interactions that occur over a certain time between users of an entity and the entity or entity representatives through any device, said system comprising:
  a back-end server including:
    at least one processor for processing data and information;
    a communications interface communicatively coupled to the at least one processor; and
    a memory device storing data and executable code that, when executed, causes the at least one processor to:
      provide an interaction source that stores information and data for each of the interactions between all of the users of the entity and the entity over all entity channels;
      provide a source of data and information that identifies each of the users of the entity;
      perform an application sessions process that groups the interactions that each user of the entity performs over a particular channel at a certain time frame into an interaction session having a time stamp for that time frame using the information and data for each of the interactions between all of the users of the entity and the entity over all of the entity channels as they are occurring;
      store the interaction sessions in an interaction session table with previously generated interaction session tables and assigning each session table a session identifications (IDs);
      perform an application interaction process that aggregates all available data and information about each user of the entity and the data and information for each interaction by the user of the entity with the entity using the information and data for each of the interactions between all of the users of the entity and the entity over all of the entity channels, the data and information that identifies each of the users of the entity and the session IDs, wherein performing the application interaction process includes using at least one neural network having nodes that have been trained to perform the application interaction process;

create an interaction timeline for each user of the entity over all of the entity channels for a predetermined time using the aggregated data and information about each user of the entity and the data and information for each interaction by the user of the entity with the entity;

perform a new interaction type process to identify new or different interactions by the users of the entity using the information and data for each of the interactions between all of the users of the entity and the entity over all of the entity channels as they are occurring; and assign a new interaction type code to the new or different interactions and store the new interaction type codes in a reference table, wherein performing the application interaction process uses the new interaction type codes.

14. The system according to claim 13 wherein the at least one processor also links descriptive and classification information about the users of the entity to the reference table.

15. The system according to claim 13 wherein the at least one processor also links interactions by the users of the entity over other entity channels to the interaction sessions in the interaction session table.

16. The system according to claim 13 wherein the at least one neural network is a convolutional neural network (CNN) or a recurrent neural network (RNN).

17. The system according to claim 13 wherein the entity channels include a website, mobile applications, branch banking, online banking and customer service center calls.

18. The system according to claim 13 wherein the predetermined time for the timeline is six months.

19. A system for generating a user interaction timeline for all interactions that occur over a certain time between users of an entity and the entity or entity representatives through any device, said system comprising:

a back-end server including:
at least one processor for processing data and information;
a communications interface communicatively coupled to the at least one processor; and
a memory device storing data and executable code that, when executed, causes the at least one processor to:
provide an interaction source that stores information and data for each of the interactions between all of the users of the entity and the entity over all entity channels;
provide a source of data and information that identifies each of the users of the entity;
perform an application sessions process that groups the interactions that each user of the entity performs over a particular channel at a certain time frame into an interaction session having a time stamp for that time frame using the information and data for each of the interactions between all of the users of the entity and the entity over all of the entity channels as they are occurring;
store the interaction sessions in an interaction session table with previously generated interaction session tables and assigning each session table a session identifications (IDs);
perform a new interaction type process to identify new or different interactions by the users of the entity using the information and data for each of the interactions between all of the users of the entity and the entity over all of the entity channels as the interactions are occurring, and assigning a new interaction type code to the new or different interactions;
store the new type codes in a reference table;
perform an application interaction process that aggregates all of the available data and information about each user of the entity and the data and information for each interaction by the user of the entity with the entity using the information and data for each of the interactions between all of the users of the entity and the entity over all of the entity channels, the data and information that identifies each of the users of the entity, the session IDs and the new interaction type codes, wherein performing an application interaction process includes using at least one neural network having nodes that have been trained to perform the application interaction process;
create an interaction timeline for each user of the entity over all of the entity channels for a predetermined time using the aggregated data and information about each user of the entity and the data and information for each interaction by the user of the entity with the entity;
link descriptive and classification information about the users of the entity to the reference table; and
link interactions by users of the entity over other entity channels to the interaction sessions in the interaction session table.

* * * * *